Figure 1:
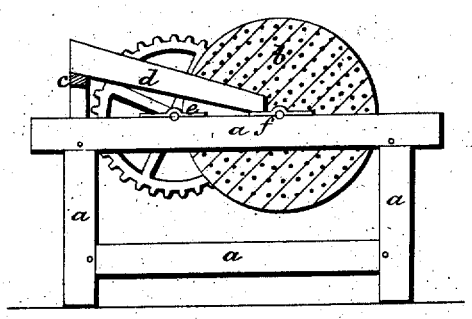
Figure 2:
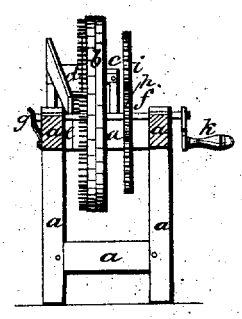
Figure 3:
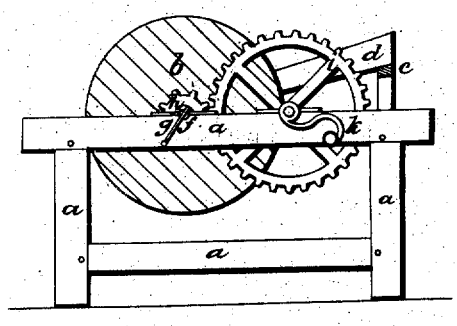

2276X
Z. Phinney.
Corn Sheller.
Patented Feb. 16, 1815.
2 Sheets- Sheet 1.
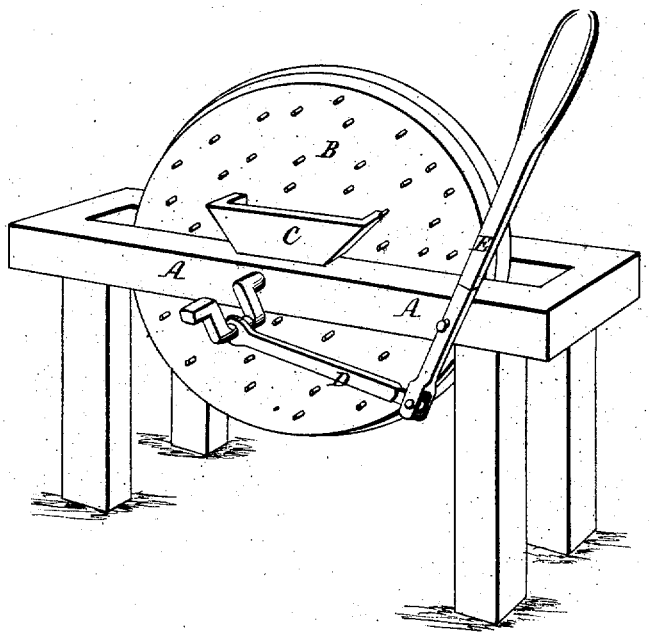

2267X

Z. Phinney.

Corn Sheller.

Patented Feb. 16, 1815.

2 Sheets-Sheet 2.

Feb 16 1815 2267X

Zina Phinney

Letters Patent

The Schedule referred to in these Letters Patent and making part of the same containing a description in the words of the said Zina Phinney himself of his machine for Shelling Corn. threshing Wheat an dressing Flax, This machine for shelling Corn, consists of a frame with four legs. so as to admit of a wheel made of plank, double crossgrain, three feet diameter, from four to six inches thick, with the side filled with nails without heads in wide rows one inch apart, or the wheel may be made of cast Iron with the nails cast in with a place in with a place in the centre for grinding by placing a plate on the frame with a small Hopper placed over it. The frame to have a plank on the inside of the legs filled with nails likewise.

This wheel when double geared must have the axletree to play back against a spring on the back side of the frame, so as to admit small or large ears to pass between the front of the frame or plank filled - with nails, and the wheel, which shells the corn by rolling through.

Another Principle of Shelling Corn on the same wheel, is by placing a plate of iron on one part of the frame near the front of the wheel for the Ear to lay on, held against the wheel by a Spring which is confined with a screw near the centre of the wheel which presses the ear against the wheel and forces the cob out endways. This wheel may be turned by water or Horse, with Crank treader or hand staff confined to the frame with a screw nearest the lower end, with a pitman round the Crank, and fastened by a screw to the lower end of the hand Staff - This purchase hand staff will answer for turning grindstones, or sawing by placing a saw on the crank of a fly wheel, which will answer for flax and wheat, by placing swingling Knives on it The Knives may be fed wheat or other grain by a box similar to the cutting box, with which may be used a round block with pegs in it, which turn by cogs near the centre of the fly wheel Zina Phinney Witnesses { William Thornton
Geo Lyon
(400 words)

( Patented 16th February 1815 )

Exd
[illegible]